United States Patent [19]

Norton

[11] Patent Number: 4,932,260
[45] Date of Patent: Jun. 12, 1990

[54] CRASH SENSING SWITCH WITH SUSPENDED MASS

[76] Inventor: Peter Norton, 1 S. Lakeside, Lake Hopatcong, N.J. 07849

[21] Appl. No.: 211,887

[22] Filed: Jun. 27, 1988

[51] Int. Cl.⁵ .............................................. G01P 15/08
[52] U.S. Cl. ................... 73/517 R; 200/61.53
[58] Field of Search ................ 73/517 R, 517 B, 514, 73/516 R; 200/61.45, 61.53

[56] References Cited

U.S. PATENT DOCUMENTS

| | | | |
|---|---|---|---|
| 2,950,908 | 8/1960 | Rainsberger et al. | 200/61.53 |
| 2,960,871 | 11/1960 | Ganther et al. | 200/61.53 |
| 2,974,529 | 3/1961 | Brueggeman et al. | 200/61.53 |
| 3,380,308 | 4/1968 | Burch et al. | 200/61.53 |
| 3,524,031 | 8/1970 | Mack | 200/61.53 |
| 4,023,413 | 5/1977 | Stauber | 73/517 B |

FOREIGN PATENT DOCUMENTS 3016001 10/1981 Fed. Rep. of Germany .
3021317 12/1981 Fed. Rep. of Germany .

Primary Examiner—Hezron E. Williams
Assistant Examiner—Robert P. Bell
Attorney, Agent, or Firm—Reising, Ethington, Barnard, Perry & Milton

[57] ABSTRACT

A crash sensor for automobiles of the type including a sensing mass movable in a closed chamber against pressure resulting from viscous flow has a disk shaped sensing mass suspended by one or two webs like those used to suspend the moving elements of audio speakers. The web suspending the sensing mass allows the sensing mass free axial motion while resisting radial motion. Movement of the sensing mass is resisted by air pressure resulting from viscous flow of air through conduits. Compensation for variation of air viscosity with temperature is achieved by varying the travel of the sensing mass. The sensor design enables accurate automatic calibration. The unit is compact and is made from a small number of inexpensive parts. The combination of these elements provides a crash sensor that is insensitive to cross axis vibrations and costs much less than current production sensors.

18 Claims, 5 Drawing Sheets

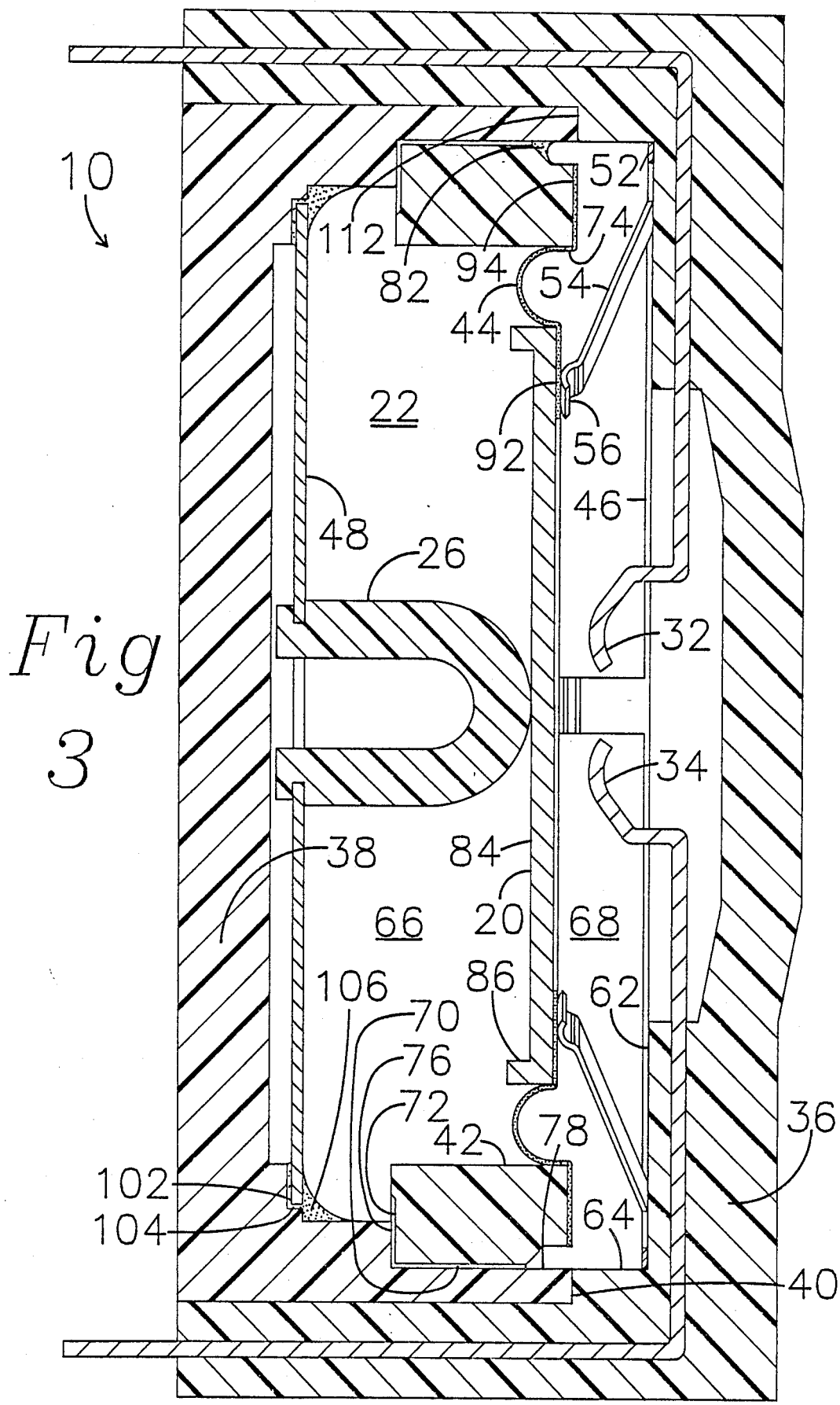

CRASH SENSING SWITCH WITH SUSPENDED MASS

FIELD OF THE INVENTION

This invention relates to devices that detect frontal collision of automobiles for activating occupant protection devices such as air bags or belt tensioners.

BACKGROUND OF THE INVENTION

Air bags are inflatable bags that remain folded and out of sight in readiness for a frontal collision. During a collision, chemical reaction of a material typically containing sodium azide produces gaseous products which inflate the bag and interpose it between the driver and the steering wheel or the front seat occupant and the dashboard.

Belt tensioners are devices that tighten automobile seat belts during a crash to hold the seat occupants more securely. A tensioner has a small motor driven by pressurized gas from the chemical reaction of gas generating material like that used for inflating air bags. In both cases, chemical reaction of the gas generating material is initiated by an electrically hated squib. The sensor of this invention may be adapted to control the power that energizes the squib.

A sensor of the type to which this invention is applicable is in commercial production by Breed Automotive Corporation. It consists of a metallic ball free to move in a sealed cylinder containing contacts that are bridged by the ball when it moves to one end of the cylinder. Air flow around the ball causes a pressure differential. The pressure differential causes a force proportional to and opposite the relative velocity of the ball with respect to the cylinder. A permanent magnet provides a bias force that retains the ball in a home position away from the contacts and causes the velocity change required for switch closure to increase with the duration of the crash pulse. The proportionality of force to velocity makes the sensor an acceleration integrator that completes the firing circuit upon achievement of a predetermined velocity change. The variation of air viscosity with temperature is compensated by making the cylinder and ball of particular and different stainless steels selected to have a difference in their thermal expansion coefficients such that the gap between the ball and cylinder changes with temperature as required to maintain the performance of the sensor over a wide temperature range.

This sensor is expensive to manufacture and one reason for the cost is the high precision required of the ball and the cylinder. Another reason for the high cost for certain applications is that the cylinder must be made of material that is difficult to machine. Further, in known designs, the contacts are connected with leadin wires and a diagnostic resistor by means such as welding or soldering. These processes create contamination during manufacturing that cannot be tolerated in the vicinity of the ball and cylinder thereby requiring additional components and processing steps to maintain isolation for cleanliness. Further, small particles in the cylinder can prevent proper operation. Therefore great care is required to insure cleanliness during manufacture and this adds to the manufacturing cost. Further, in certain crashes there is substantial cross axis vibration which causes the ball motion to not be simple linear movement down the cylinder which affects the calibration of the sensor and extraordinary measures such as vibration damping isolators and other means are required to minimize these effects and these measures are not always entirely successful.

A second sensor of the type to which this invention is applicable has been widely promoted by Breed Automotive Corporation. It is like the first except that the bias is supplied by a lever driven by a spring and, instead of bridging contacts, the movement of the ball releases a firing pin to impinge on a stab primer and thereby initiate deployment of an air bag.

Copending application Ser. No. 190165 titled *Compact Crash Sensing Switch And Diagnostic System* filed May 5, 1988 describes a crash sensor of the type including a ball moving in a cylinder with a semiconductor device for completing the firing circuit and also having diagnostic capabilities. The semiconductor switch and diagnostic features of that invention are applicable to the present invention and the application Ser. No. 190165 is incorporated herein by reference.

A general object of this invention is to provide a crash sensor for automotive vehicles which overcomes certain disadvantages of the prior art.

SUMMARY OF THE INVENTION

The present invention provides a crash sensor of the type having a viscously damped sensing mass with sensing means to sense when the sensing mass has reached a firing position which is highly reliable, insensitive to cross axis vibrations, compact, light in weight, and economical to manufacture.

Further, in accordance with this invention, viscous flow of the air displaced by motion of the sensing mass is achieved by passing the air through conduits made by molding flutes in the outer diameter and end of a plastic cylinder.

Further, in accordance with this invention, the sensing mass is suspended by a web of thin rubberized fabric of the type commonly used in audio speakers.

Further, in accordance with this invention, the calibration of each sensor can be adjusted automatically during manufacture thereby resulting in sensors that are easily calibrated to high accuracy.

Further, in accordance with this invention, a ring of spring material having inwardly directed fingers that apply force to the sensing mass retains the sensing mass in the normal resting position during normal operation of the vehicle.

Further, in accordance with this invention, compensation for variations of air viscosity with temperature is achieved by varying the initial position of the sensing mass which thereby varies the sensing mass travel required to close the switch.

Further, in accordance with this invention, vent holes in the web are exposed when a predetermined movement of the sensing mass has occurred thereby providing a second path for the air displaced by movement of the sensing mass which reduces the air pressure differential and enhances movement of the sensing mass thereby increasing the force between the sensing mass and the contacts and improving the contact quality and increasing contact duration.

Further, in accordance with one embodiment of this invention, two webs positioned to suspend two points on the axis of the sensing mass constrain the sensing mass axis to remain parallel with the axis of the sensor.

Further, in accordance with one embodiment of this invention, the sensing mass initiates movement of a firing pin for piercing a stab primer.

A complete understanding of this invention may be obtained from the description that follows taken with the accompanying drawings.

DESCRIPTION OF THE DRAWINGS

FIG. 3 shows a complete sensor of one embodiment of the invention with certain parts shown in section and the sensing mass in its normal or resting position;

BEST MODE FOR CARRYING OUT THE INVENTION

Figure 1:
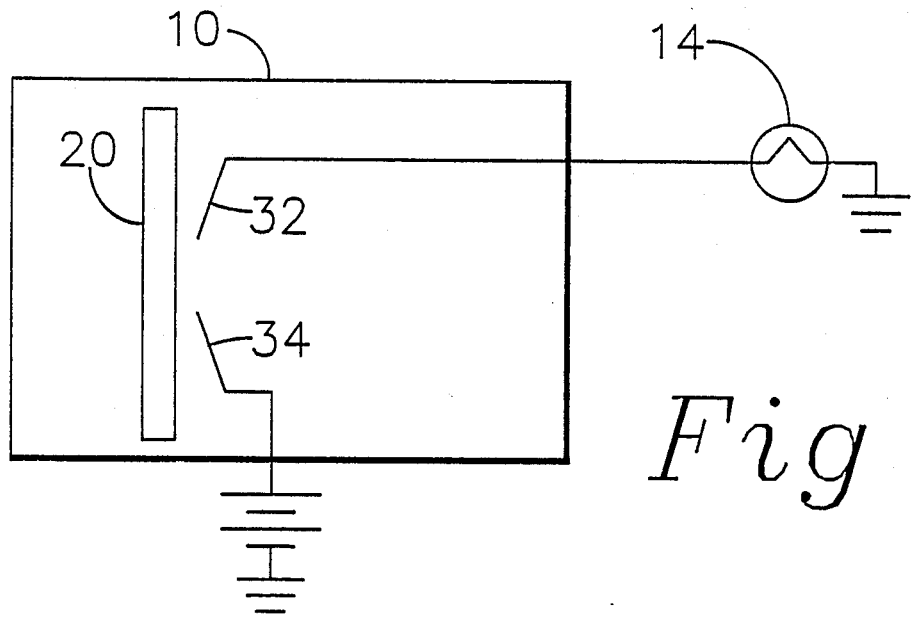
FIG. 1 shows an electric schematic diagram of an occupant protection system including the sensor of the invention and the firing circuit.

Referring now to the drawings, an illustrative embodiment of the invention is shown in a crash sensor. Referring particularly to FIG. 1, the crash sensor 10 comprises a sensing mass 20 adapted for bridging contacts 32 and 34 and providing power to an occupant protection device 14 upon sensing an acceleration pulse indicative of a crash. The firing circuit consists of the conductor to the battery, the conductor to squib 14, the squib itself, and the ground connection that completes the circuit through the squib.

Figure 2:
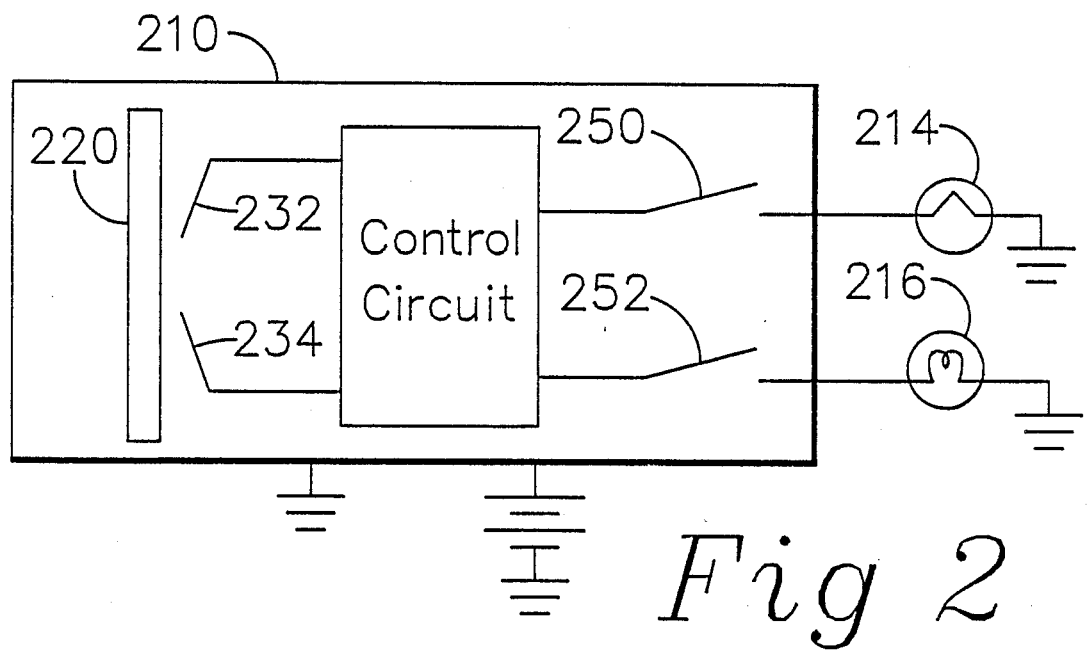
FIG. 2 shows an electrical schematic diagram of an occupant protection system including the sensor of the invention wit a semiconductor switch and a diagnostic system as disclosed in the aforementioned copending application Ser. No. 190165 and showing the firing circuit.

Referring now particularly to FIG. 2, the crash sensor 210 comprises a sensing mass 220 adapted for bridging contacts 232 and 234 and initiating closure of switch 250 for providing power to an occupant protection device 214 upon sensing an acceleration pulse indicative of a crash. An integral diagnostic system includes a switch 252 which closes to turn on a warning light when a defect in the firing circuit is detected. The switches 250 and 252 and the related electronic circuits are described in the aforementioned copending application Ser. No. 190165 .

Figure 7:
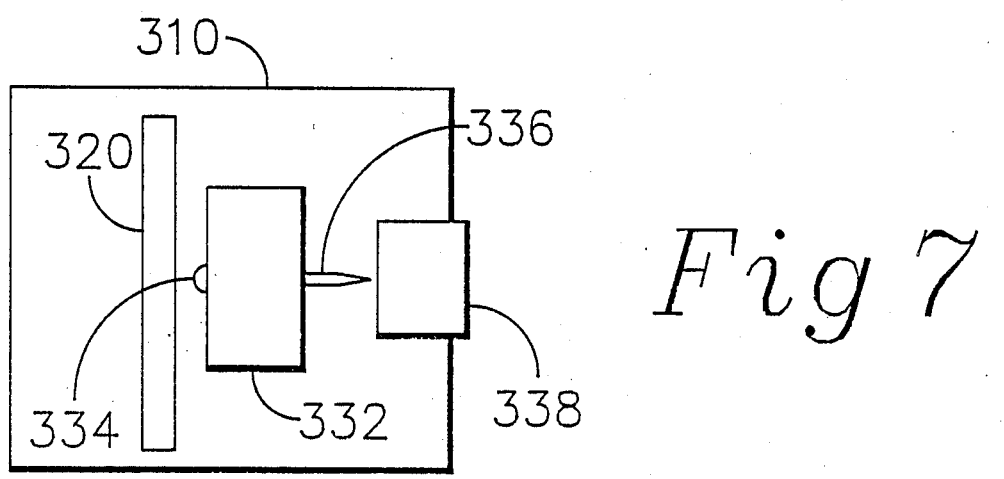
FIG. 7 shows a third embodiment of the invention adapted for piercing a stab primer.

Referring now particularly to FIG. 7, the crash sensor 310 comprises a sensing mass 320 adapted for contacting trigger button 334 and thereby releasing actuator 332 to drive the pointed shaft 336 into stab primer 338 for initiating combustion of chemicals contained in stab primer 338 for initiating deployment of an airbag upon sensing an acceleration pulse indicative of a crash.

It will be appreciated as the description proceeds that the invention may be implemented in different embodiments.

Figure 4:
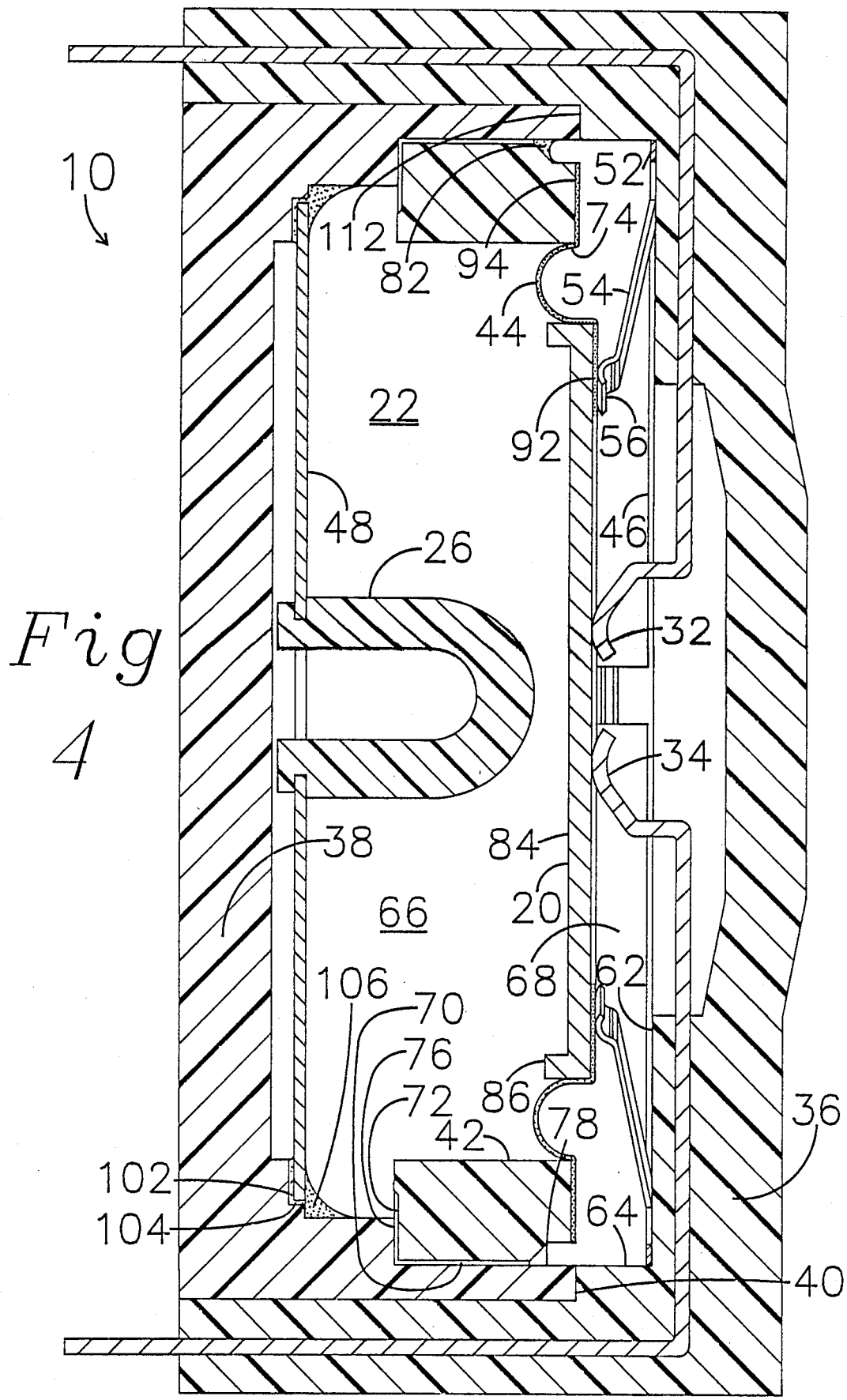
FIG. 4 shows the sensor illustrated in FIG. 3 with the sensing mass in its activated position which would happen when the vehicle is involved in a frontal collision.

Referring now to FIGS. 3 and 4, the crash sensor 10 comprises a sensing mass 20 with a gold plated surface for bridging two electrical contacts 32 and 34. Contacts 32 and 34 are preferably bifurcated. Sensing mass 20 moves in cavity 22 between stop 26 and a position beyond the point where it bridges contacts 32 and 34. Sensor 10 also comprises outer housing 36, inner housing 38, fluted ring 42, sensing mass suspending web 44, bias spring 46, and bimetallic washer 48.

Contacts 32 and 34 are embedded in outer housing 36 by any suitable method. One method is to include the contacts during injection molding. Another method is to injection mold the outer housing 36 with conduits for later insertion of contacts 32 and 34 and then use an adhesive to attach the contacts The latter method has the advantage that the contacts can be accurately positioned with respect to the height of annular ledge 40 during adhesive curing.

Bias spring 46 is designed to urge sensing mass 20 toward stop 26 with a force more than sufficient to hold sensing mass 20 against stop 26 during normal operation of the vehicle. Bias spring 46 comprises torsionally elastic outer ring 52, inwardly extending fingers 54 with curved ends 56. It is held in place against bottom 62 and inner diameter 64 of outer housing 36 by the reaction to the force it applies to sensing mass 20.

Chamber 22 is divided into compartments 66 and 68 by sensing mass 20, web 44, and fluted ring 42. Fluted ring 42 is preferably made of injection molded plastic. It has flutes on its outer circumference and on one end which create air conduits 70 and 72 through which air flows viscously when the sensing mass 20 moves. Contact with the inner diameter of fluted ring 42 prevents air leakage through vent holes 74 in the web 44 when the web is against fluted ring 42. Fluted ring 42 is held in place against lip 76 and inner diameter 78 of inner housing 38 by adhesive 82 applied at a sufficient number of places to insure retention of fluted ring 42. A second purpose of adhesive 82 is for calibration of the sensor. The adhesive 82 can be used to close a number of the conduits 70 to accurately determine the resistance to the flow of air from compartment 68 to compartment 66. This is accomplished during manufacture following the insertion of fluted ring 42 in inner housing 38 by forcing air through conduits 70 and 72 while measuring the pressure drop and adding adhesive 82 around the circumference of fluted ring 42 until the desired pressure drop is achieved.

Sensing mass 20 is a disk of any suitable material such as brass or stainless steel. It comprises a flat area 84 and a raised lip 86. The surface is plated with gold where contact is made with contacts 32 and 34. Lip 86 supports web 44 during the travel of sensing mass 20.

Web 44 is preferably a woven fabric formed into the shape illustrated and coated with a rubberlike material that makes the fabric impervious to the passage of air through itself. It is then bonded to fluted ring 42 and to sensing mass 20 as illustrated. The manufacture of rubberized fabric in approximately the shape illustrated followed by bonding to supporting surfaces is well known in the manufacture of audio speakers.

Stop 26 is preferably made of injection molded plastic and is preferably attached to bimetallic washer 48 during the molding process. The assembly comprising bimetallic washer 48 and stop 26 is held in place adjacent lip 102 and inner diameter 104 of inner housing 38 by adhesive 106. During curing of the adhesive stop 26 is held in an accurately determined position relative to the end 112 of inner housing 38. The accurate positioning of stop 26 relative to end 112 in combination with the accurate positioning of the contacts with respect to the height of annular ledge 40 insures accurate positioning of the sensing mass 20 with respect to contacts 32 and 34.

Figure 5:
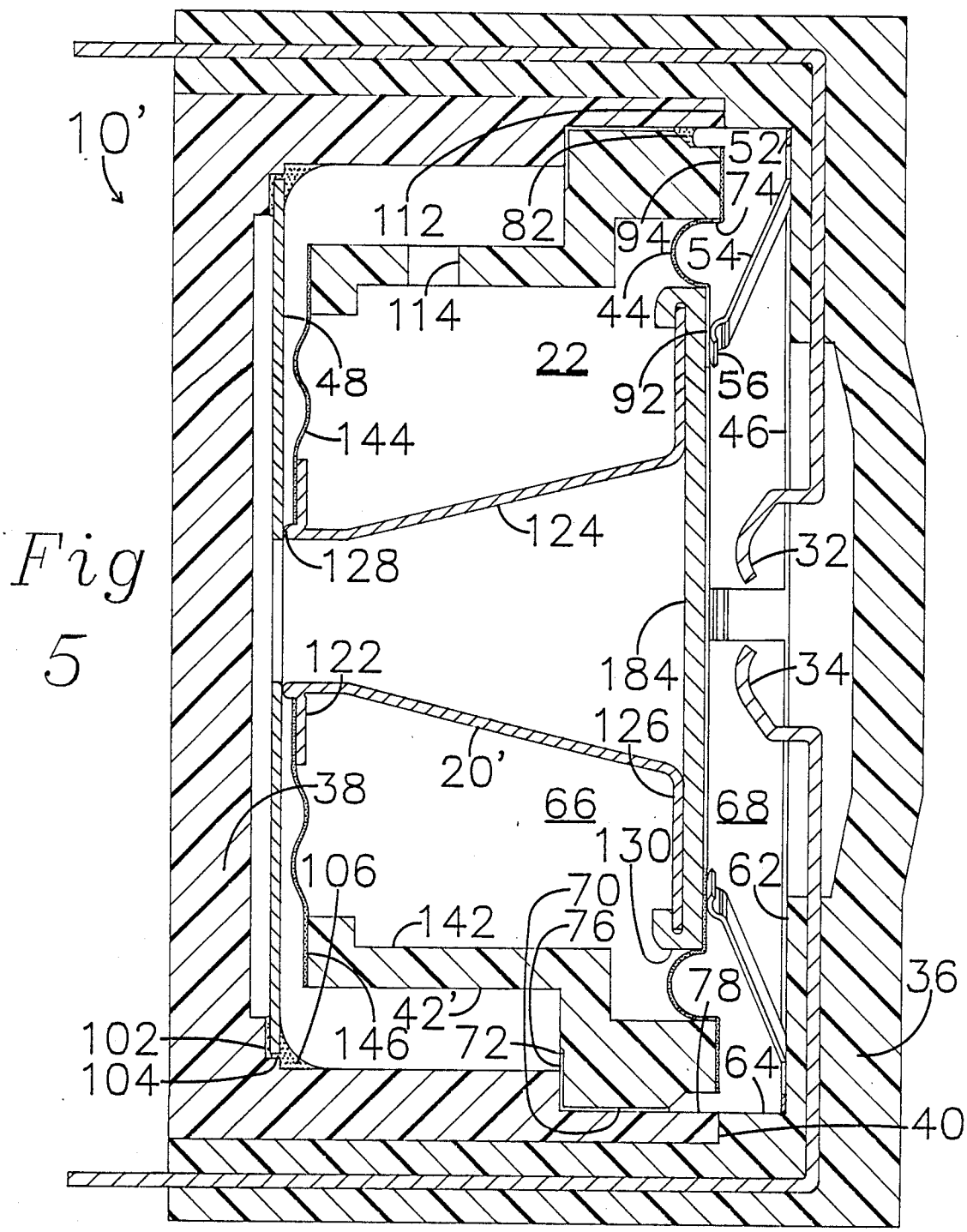
FIG. 5 shows a complete sensor of a second embodiment of the invention with certain parts shown in section and the sensing mass in its normal or resting position.
Figure 6:
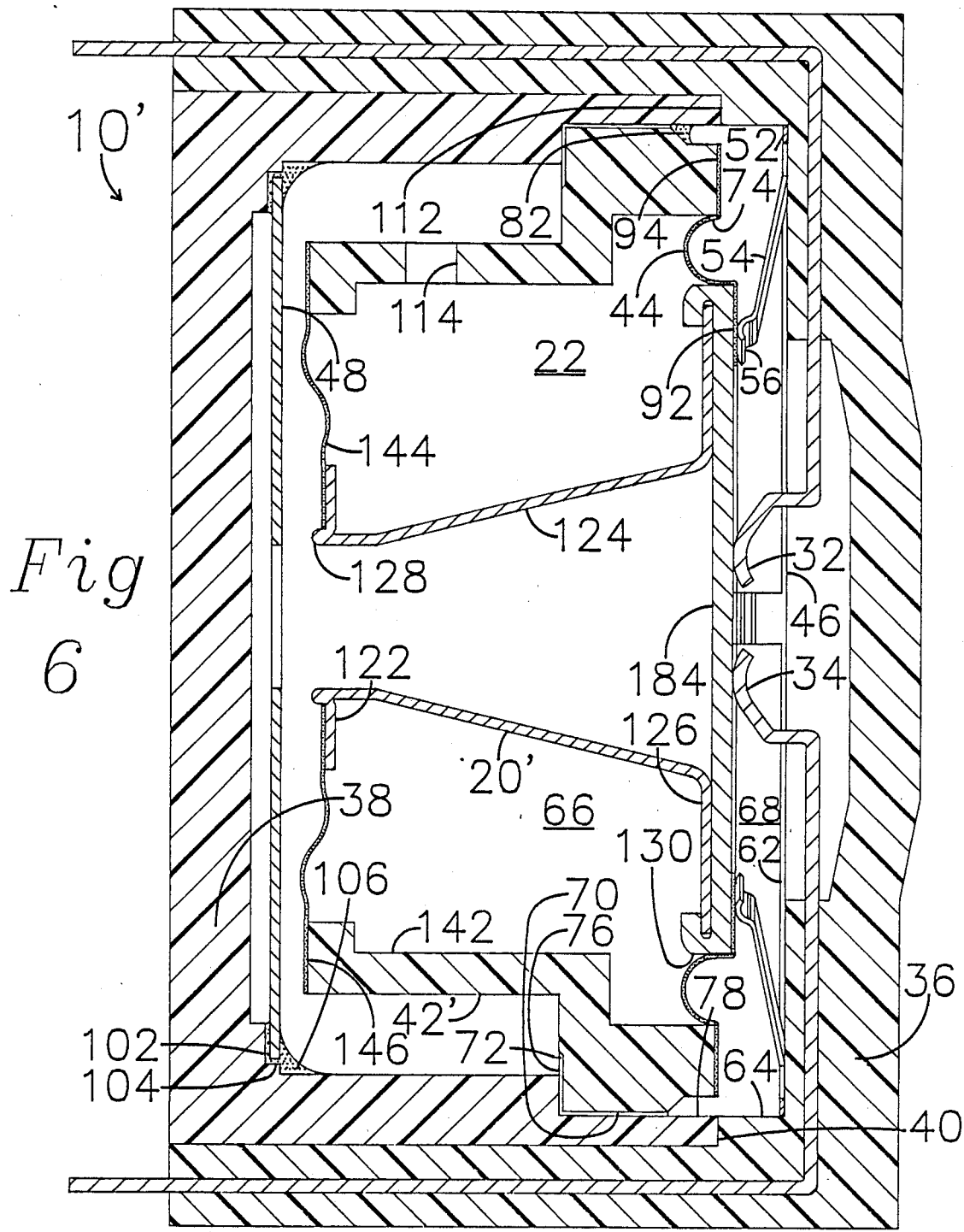
FIG. 6 shows the sensor illustrated in FIG. 5 with the sensing mass in its activated position which would happen when the vehicle is involved in a frontal collision.

Referring now to FIGS. 5 and 6, the crash sensor 10' is different from the crash sensor 10 illustrated in FIGS. 3 and 4 by the addition of an axial extension to the sensing mass and a second suspending web. The two suspensions working together prevent the sensing mass from tilting. In the following description components that differ from the components illustrated in FIGS. 3 and 4 are identified by an apostrophe. Unchanged components are numbered the same as in FIGS. 3 and 4. The crash sensor 10' comprises a sensing mass 20' for bridging two electrical contacts 32 and 34. Sensing mass 20' moves in cavity 22 between a position where it rests against bimetallic washer 48 and a position beyond the point where it bridges contacts 32 and 34. Sensor 10' also comprises outer housing 36, inner housing 38, fluted ring 42', sensing mass suspending webs 44 and 144, bias spring 46, and bimetallic washer 48. The design and function of the outer housing 36, inner housing 38, web 44, and bias spring 46 are the same as the corresponding components illustrated in FIGS. 3 and 4. Fluted ring 42' is different only by addition of the extension 142 added to support web 144. Bimetallic washer 48 is unchanged but in FIGS. 5 and 6 it directly contacts sensing mass 20' whereas in FIGS. 3 and 4 it supports stop 26 which contacts sensing mass 20.

Chamber 22 is divided into compartments 66 and 68 by sensing mass 20', web 44, and fluted ring 42'. Sensing mass 20 comprises a disk 184 and extension 124 which may be made of any suitable metal such as aluminum, brass, or stainless steel It is also possible to make extension 124 of plastic. Sensing mass extension 124 comprises a flat end 122, a second flat end 126, and a tubular section joining the flat ends terminating at stop 128. The distance from stop 128 to flat end 126 is accurately maintained during manufacture of the sensing mass. Disk 184 and extension 124 are made into a unitary assembly by folding the outer circumference of disk 184 over the outer circumference of end 126 of extension 124. Cylindrical surface 130 is formed on the outer circumference of the fold to support web 44 during the travel of sensing mass 20'. The surface of disk 184 is plated with gold where contact is made with contacts 32 and 34.

Web 144 is preferably a fabric formed into the shape illustrated and coated with a suitable material. Web 144 is not required to be impervious to air and it flexes much less than web 44. One material used in the audio speaker industry is cloth impregnated with phenolic resin. Web 144 is bonded to the end 146 of extension 142 of fluted ring 42' and to end 122 of sensing mass extension 124 as illustrated. Opening 114 allows passage of air so that the pressure is the same throughout compartment 66.

Bimetallic washer 48 is held in place adjacent lip 102 and inner diameter 104 of inner housing 38 by adhesive 106. During curing of the adhesive bimetallic washer 48 is held in an accurately determined position relative to the end 112 of inner housing 38. The accurate positioning of bimetallic washer 48 relative to end 112 in combination with the accurate positioning of the contacts with respect to the height of annular ledge 40 and manufacture of sensing mass extension 124 to an accurate length insures accurate positioning of the sensing mass 20 with respect to contacts 32 and 34.

FIG. 4 illustrates the same sensor as illustrated in FIG. 3 but with the sensing mass just at the point of contacting contacts 32 and 34. FIG. 6 illustrates the same sensor as illustrated in FIG. 5 but with the sensing mass just at the point of contacting contacts 32 and 34.

The operation of the system of this invention, will now be described with reference to FIGS. 3, 4, 5, and 6. Reference numbers in parentheses refer to FIGS. 5 and 6.

In operation of the system, sensing mass 20 (or 20') is normally held against stop 26 (or bimetallic washer 48) by the force applied by ends 56 of fingers 54 of spring 46. When a deceleration much greater than one g is applied to the sensor, as would happen during an automobile crash, the inertia of the sensing mass 20 (or 20') causes it to move away from the stop 26 (or bimetallic washer 48) and toward electrical contacts 32 and 34. The inertial force causes a pressure differential between compartments 66 and 68 proportional to the deceleration of the sensor. For this movement to occur it is necessary for some of the air in compartment 68 to pass through conduits 70 and 72 into compartment 66. The movement of the air through conduits 70 and 72 is resisted by the viscosity of the air thereby causing a pressure differential with the pressure in compartment 68 being greater than the pressure in compartment 66. Further, the viscous character of the flow causes the flow rate to be proportional to the pressure differential. This pressure differential opposes the movement of sensing mass 20 (or 20') toward electrical contacts 32 and 34 and causes its rate of travel to be proportional to the deceleration, thereby causing the sensor to function as an acceleration integrator so that contact is not achieved until a predetermined velocity change has occurred.

During movement of the sensing mass 20 (or 20') web 44 (webs 44 and 144) suspend the sensing mass and resist movement in the radial direction but allow movement in the axial direction. Just before sensing mass 20 (or 20') reaches the contacts 32 and 34 which is illustrated in FIG. 4 (or 6), vent holes 74 in web 44 separate from fluted ring 42 (or 42') and thereby open a second route for passage of air between compartments 66 and 68. This allows additional air to move between the two compartments and thereby releases sensing mass 20 (or 20') to move more freely toward the contacts to increase the contact pressure and make better contact. Good contact is important when the contacts are included directly in the firing circuit. However, when the contacts only carry a small amount of current for a purpose such as initiating a change of state of a semiconductor device as illustrated in FIG. 2 and described in copending application Ser. No. 190165 previously referred to there is no advantage to including vent holes 74.

When the sensing mass contacts both electrical contacts current flows from contact 34 through sensing mass 20 (or 20') to contact 32 thereby closing the circuit for initiation of the occupant protection devices.

At lower ambient temperatures bimetallic washer 48 flexes to move its inner diameter farther from the contacts 32 and 34. In the case of the embodiment illustrated in FIGS. 3 and 4 stop 26 is also moved farther from contacts 32 and 34. In both embodiments this positions sensing mass 20 (or 20') farther from contacts 32 and 34 which requires sensing mass 20 (or 20') to travel farther before reaching contacts 32 and 34 during a crash and compensates for the reduced viscosity of air at lower temperatures. At higher temperatures the inner diameter of bimetallic washer moves nearer the contacts 32 and 34 thereby compensating for the higher viscosity of air at higher temperatures.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A crash sensor comprising a sensing mass movable in a chamber,
   flexible suspension means suspending said sensing mass and dividing said chamber into two compartments,
   said chamber being filled with a viscous fluid,
   said flexible suspension means blocking movement of said viscous fluid between said compartments,
   and a first flow control means for viscously conducting said viscous fluid between said compartments.

2. The invention as defined by claim 1 wherein:
   said first flow control means comprises a fluid conduit.

3. The invention as defined by claim 1 wherein:
   said flexible suspension means comprises woven material impregnated with material making the woven material impervious to said viscous fluid.

4. The invention as defined by claim 1 wherein:
   said sensing mass is movable between a normal resting position at one extreme of its travel and a second position attained during a crash, and including:
   second flow control means for allowing said viscous fluid to bypass said first flow control means upon movement of said sensing mass to a predetermined position away from said normal resting position.

5. The invention as defined by claim 4 wherein:
   said second flow control means comprises openings in said flexible suspension means.

6. The invention as defined by claim 1 wherein:
   said sensing mass is movable between a normal resting position at one extreme of its travel and a second position attained during a crash, and including:
   sensing means for ascertaining when said sensing mass attains said second position.

7. The invention as defined by claim 6 wherein:
   said sensing means comprises contacts adapted for bridging by said sensing mass.

8. The invention as defined by claim 1 wherein said viscous fluid is air.

9. The invention as defined by claim 1 wherein:
   said first flow control means is adjustable for calibration.

10. The invention as defined by claim 2 wherein:
    there is a multiplicity of said conduits blocking means in a selected one or more of said conduits for calibration of the viscous resistance to said viscous conduction of said viscous fluid during said movement of said sensing mass.

11. A crash sensor comprising a sensing mass movable in a chamber wherein:
    flexible suspension means for said sensing mass,
    said sensing mass is movable between a normal resting position at one extreme of its travel and a second position attained during a crash, and including
    resilient means urging said sensing mass toward said normal resting position, and
    said resilient means comprises a ring having inwardly extending elements for applying force to said sensing mass.

12. The invention as defined by claim 1 wherein:
    said sensing mass is movable between a normal resting position at one extreme of its travel and a second position attained during a crash, and including,
    temperature responsive means for determining said normal resting position in accordance with temperature.

13. The invention as defined by claim 1 wherein:
    said sensing mass has an axially extending member and including,
    a second flexible suspension means for suspending said sensing mass at said axially extending member.

14. The invention as defined by claim 6 wherein:
    said sensing means comprises semiconductor means adapted for completing an electric circuit upon said movement of said sensing mass to said second position.

15. The invention as defined by claim 1 wherein:
    said sensing mass is movable between a normal resting position at one extreme of its travel and a second position attained during a crash, and including,
    ignition means responsive to mechanical impact, and
    striking means for striking said ignition means upon said movement of said sensing mass to said second position.

16. A crash sensor comprising a sensing mass movable in a chamber, said chamber being divided into two compartments,
    said chamber being and filled with a viscous fluid and said sensing mass being adapted to displace said viscous fluid from one of said compartments to the other of said compartments during its movement, and
    channels for viscously conducting said viscous fluid between said compartments.

17. The invention as defined by claim 16 including:
    means for blocking a selected one or more of said channels for calibrating said sensor.

18. The invention as defined by claim 16 wherein:
    said channels result from the mating of two surfaces and one of said surfaces is fluted.

* * * * *